United States Patent
Gerra et al.

(10) Patent No.: US 7,350,150 B2
(45) Date of Patent: *Mar. 25, 2008

(54) METHODS AND APPARATUS FOR ACCESSING INFORMATION FROM MULTIPLE REMOTE SOURCES

(75) Inventors: Michael Gerra, Dallas, TX (US); Joseph Robert Offutt, Jr., Grapevine, TX (US)

(73) Assignee: Sabre Inc., Southlake, TX (US)

( * ) Notice: Subject to any disclaimer, the term of this patent is extended or adjusted under 35 U.S.C. 154(b) by 668 days.

This patent is subject to a terminal disclaimer.

(21) Appl. No.: 10/677,469

(22) Filed: Oct. 2, 2003

(65) Prior Publication Data

US 2004/0070603 A1    Apr. 15, 2004

Related U.S. Application Data

(63) Continuation of application No. 09/847,337, filed on May 3, 2001, now Pat. No. 6,630,942, which is a continuation of application No. 09/031,674, filed on Feb. 27, 1998, now Pat. No. 6,229,534.

(51) Int. Cl.
    *G06F 3/00* (2006.01)
(52) U.S. Cl. .................. 715/744; 715/738; 715/748; 715/733; 715/717; 715/737; 715/761; 715/764; 715/769; 715/781; 709/203; 709/218; 709/219
(58) Field of Classification Search ............... 345/744, 345/733, 804, 854, 840; 709/203, 217, 219, 709/218; 715/744, 738, 748, 733, 717, 737, 715/761, 764, 769, 781

See application file for complete search history.

(56) References Cited

U.S. PATENT DOCUMENTS

| 4,788,643 A | 11/1988 | Trippe et al. |
| 5,001,710 A * | 3/1991 | Gawrys et al. ............. 370/271 |
| 5,311,425 A | 5/1994 | Inada |
| 5,649,186 A | 7/1997 | Ferguson |
| 5,754,830 A | 5/1998 | Butts et al. |
| 5,768,578 A | 6/1998 | Kirk et al. |
| 5,796,393 A | 8/1998 | MacNaughton et al. |

(Continued)

FOREIGN PATENT DOCUMENTS

EP    0 660 251 A2    6/1995

(Continued)

OTHER PUBLICATIONS

Tom Tessier; Sharing Data Between Web Page Frames Using JavaScript; *Programmer's Workbench; Dr. Dobb's Journal*; May 1996; pp. 72, 74, 75, 86, 87.

*Primary Examiner*—Ba Huynh
*Assistant Examiner*—Rashedul Hassan
(74) *Attorney, Agent, or Firm*—Alston & Bird LLP

(57) ABSTRACT

In accordance with the present invention a process is provided for interfacing a legacy application and internet-based application and for displaying information from each application in a frame of a multi-frame browser on a client workstation. Further, the interface system enables users to transact business with the legacy application based on information retrieved from the internet-based application, and to retrieve information from the internet-based application based on information retrieved from the legacy application.

6 Claims, 8 Drawing Sheets

U.S. PATENT DOCUMENTS

| | | |
|---|---|---|
| 5,809,248 A | 9/1998 | Vidovic |
| 5,838,906 A | 11/1998 | Doyle et al. |
| 5,864,827 A | 1/1999 | Wilson |
| 5,867,153 A | 2/1999 | Grandcolas et al. |
| 5,893,093 A | 4/1999 | Wills |
| 5,940,075 A | 8/1999 | Mutschler, III et al. |
| 5,948,040 A * | 9/1999 | DeLorme et al. ........... 701/201 |
| 6,028,602 A | 2/2000 | Weidenfeller et al. |
| 6,229,534 B1 | 5/2001 | Gerra et al. |

FOREIGN PATENT DOCUMENTS

| | | |
|---|---|---|
| EP | 0 660 251 A3 | 6/1995 |

* cited by examiner

METHODS AND APPARATUS FOR ACCESSING INFORMATION FROM MULTIPLE REMOTE SOURCES

CROSS-REFERENCE TO RELATED APPLICATIONS

This application is a continuation of U.S. application Ser. No. 09/847,337, filed May 3, 2001 now U.S. Pat. No. 6,630,942, which is a continuation of Ser. No. 09/031,674 filed Feb. 27, 1998 and issued as U.S. Pat. No. 6,229,534, dated May 8, 2001, all of which are hereby incorporated herein in their entireties by reference.

BACKGROUND OF THE INVENTION

This invention generally relates to interfaces for computer systems and, more particularly, to an interface for viewing in separate frames information from at least two remote sources and communicating information between the frames to enhance the user's access to information from the sources.

The Internet, fueled by the phenomenal popularity of the World Wide Web (WWW), has exhibited exponential growth over the past few years. In the case of the WWW, the ease of self-publication has helped generate an estimated 50-120 million documents on a broad range of subjects.

To access all this information, users need only standard computer equipment, such as a personal computer with a display and modem, and an Internet connection. Several types of Internet connections are available, including connections through Internet Service Providers (ISPs). To use an Internet connection from an ISP, for example, the user dials into a computer at the ISP's facility using the modem and a standard telephone line. The ISP's computer in turn provides the user with access to the Internet.

Through this Internet connection, the user accesses information on the web using a computer program called a "web browser," such as the Netscape Navigator™ from Netscape Communications Corporation. To accomplish this, the user gives the web browser a Uniform Resource Locator (URL) for an object on the Internet, for example, a document containing information of interest. The document is referred to as a "web page," and the information contained in the web page is called "content." Web pages often refer to other web pages using "hypertext link" or "hyperlinks" that include words or phrases representing the other pages in a form that gives the browser a URL for the corresponding web page when a user selects a hyperlink. Hyperlinks are made possible by building web pages using the Hypertext Markup Language (HTML).

The URL identifies a specific computer on the Internet, called a "Web Server," and, more particularly, the location of a web page located on the web Server. The web browser retrieves the web page and displays it for the user.

The Internet thus provides users access to a wide variety of information. For example, users can use the Internet to locate information on current and upcoming events in cities and communities throughout the world.

In contrast, companies offering access to specific types of information have used and continue to use stand-alone, client-server, or client-to-host applications that deliver specific or proprietary functionality and related information to a client workstation. For example, in the travel industry the SABRE® System provides users such as travel agents with access to numerous databases of travel information for the purpose of making customer reservations with airlines, hotels, car rental agencies, etc. SABRE® is a registered trademark of The SABRE Group, Inc.

The travel industry is dominated by such legacy systems because long ago certain travel industry groups, notably the United States-based airline industry, settled on several computer-based reservation systems (CRSs) for managing flight reservation information based on each traveler's desired origination-to-destination journey. CRSs generally arrange, organize, and store this data in a format generally corresponding to the dominant travel routing patterns, in which a carrier accepts a passenger at a first, origination location and discharges the passenger at a terminal or destination location. The data is generally stored in several databases within each reservation system: schedules, tariffs, and travel rules.

Booking a flight through a CRS involves creating a computer record called the Passenger Name Record (PNR) of data from each of these databases. As flights are booked for different carriers, the system sends a message with the flight information to the airline's computers. The PNR is used to generate tickets and itineraries.

Current legacy applications, such as CRSs, and newer HTML-based Internet applications deliver discrete and separate information streams to a client workstation. While a user may be able to use both applications at the same time, the user is not able to share events or information across these applications because the applications function totally independently of each other. For example, a travel agent can display rich destination content for New York City from a web site with the help of a web browser. Then, by switching to a different window on the same workstation, the agent can use a CRS such as the SABRE System to display a list of airline flights to New York. However, the two information displays are in no way linked, either physically or logically. This requires the travel agent to be familiar with two different systems, different data sources, different windows, and different transactions.

There is therefore a need for a system that bridges the gap between these two environments by passing information from a legacy application like a CRS to a web- or HTML-based application, and vice versa, at the level of the client workstation.

BRIEF SUMMARY OF THE INVENTION

Accordingly, systems and methods consistent with the present invention substantially obviate one or more of the problems due to limitations, shortcomings, and disadvantages of the related art by bridging legacy applications and internet-based applications at the client workstation. In accordance with the present invention a process is provided for interfacing a legacy application and internet-based application and for displaying information from each application in a frame of a multi-frame browser on a client workstation. Further, the interface system enables users to transact business with the legacy application based on information retrieved from the internet-based application, and to retrieve information from the internet-based application based on information retrieved from the legacy application.

In accordance with the present invention, as embodied and broadly described herein, a method for accessing information from multiple remote resources using a workstation having a display and a connector for connecting to the remote systems comprises (i) receiving a record from a first remote resource; (ii) displaying data associated with the record in a first frame on the display; (iii) transmitting a request corresponding to the displayed data to a second remote resource; and (iv) displaying data associated with the transmitted request in a second frame on the display. The transmitting step includes parsing the record for selected information, and generating the request using the selected information. The step of displaying data associated with the transmitted request in a second frame involves receiving a response to the transmitted request, and building a page for display in the second frame. The step of transmitting a request may also include identifying the second remote system based on the displayed data in the first frame. The step of displaying data associated with the transmitted request in a second frame on the display includes determining whether the data associated with the transmitted requests contains a tag, and displaying a button corresponding to the tag within the second frame.

Both the foregoing general description and the following detailed description are exemplary and explanatory only, and merely provide further explanation of the claimed invention.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION OF THE INVENTION

Reference will now be made in detail to an implementation of the present invention as illustrated in the accompanying drawings. Wherever possible, the same reference numbers will be used throughout the drawings and the following description to refer to the same or like parts.

Systems consistent with the present invention include several components: (1) a browser with a multi-frame viewer, one frame for displaying information from each source; (2) an event handler that observes events in the frames; and (3) a rendering component that moves information in both directions between frames by, for example, (a) capturing an event observed inside the legacy application frame, parsing data related to the event, and rebuilding information into an HTML-based format for delivery to a web server, and (b) parsing user-defined functions embedded in the HTML data stream delivered to the HTML application frame, and converting the functions into a format for delivery to the legacy application. Additional components provide the necessary connections between the client workstation and the remote resources.

The present invention may be implemented by computers organized in a conventional distributed processing system architecture. The architecture for and procedures to implement this invention, however, are not conventional, because they bridge multiple remote information sources, such as a legacy computer application and an HTML-based Internet application, at the client workstation.

Figure 1:
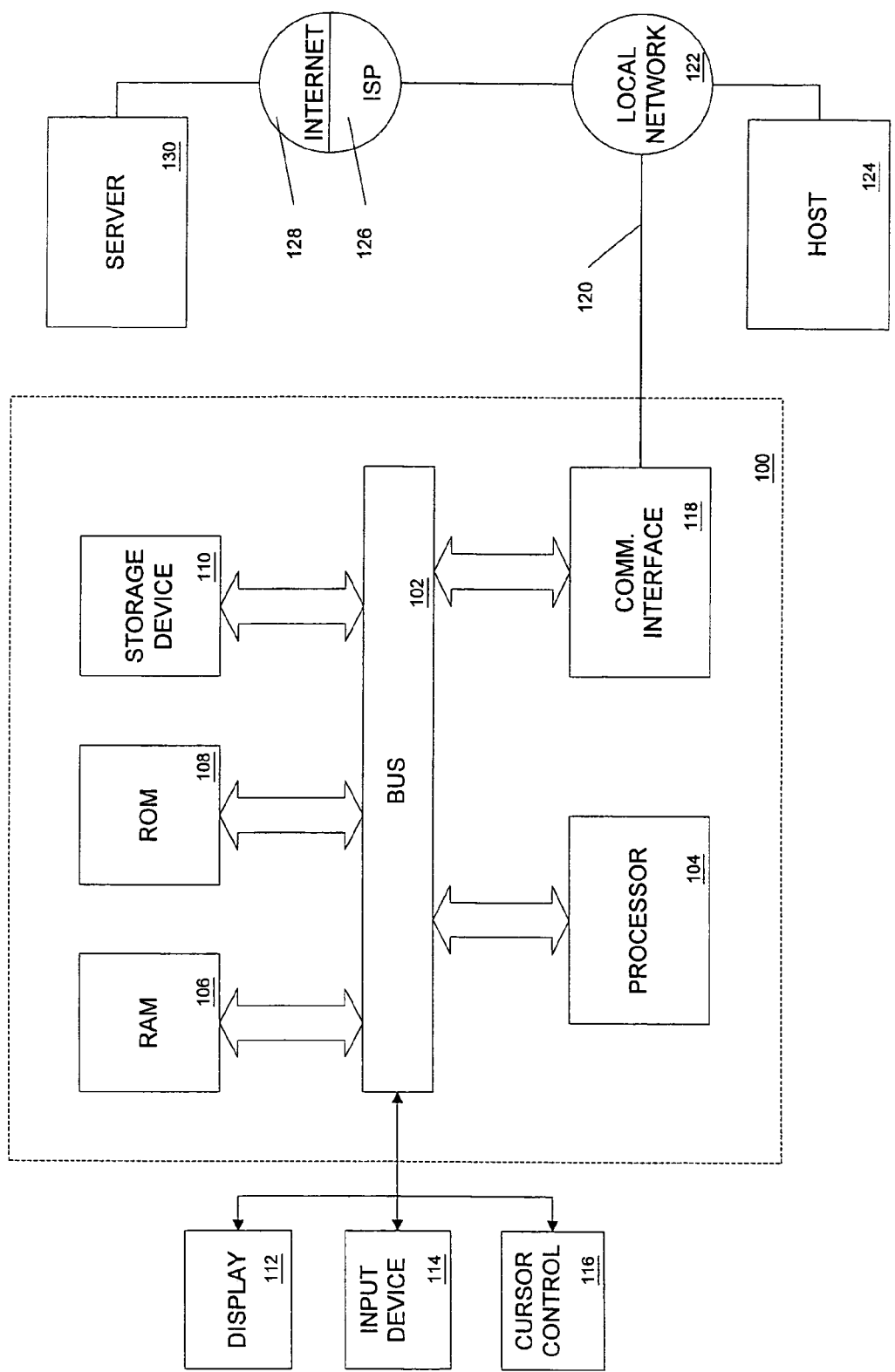
FIG. 1 is a schematic block diagram of a computer architecture suitable for use with the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for accessing information from multiple remote resources. According to one implementation of the invention, information from the multiple remote resources is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refer to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to local network 122. For example, communication interface 118 may be an integrated services digital network (ISDN) card or a modem to provide a data communication connection to a corresponding type of telephone line. As another example, communication interface 118 may be a local area network (LAN) card provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the present invention, one such downloaded application provides a bridge between two remote information sources, as described herein. The received code may be executed by processor 104 as it is received, and/or stored in storage device 110, or other non-volatile storage for later execution. In this manner, computer system 100 may obtain application code in the form of a carrier wave.

Although computer system 100 is shown in FIG. 1 as being connectable to one server, 130, those skilled in the art will recognize that computer system 100 may establish connections to multiple servers on Internet 128. Each such server includes an HTML-based Internet application, which may provide information to computer system 100 upon request in a manner consistent with the present invention. Additionally, for purposes of this description host 124 comprises a legacy computer application such as CRS.

Figure 2:
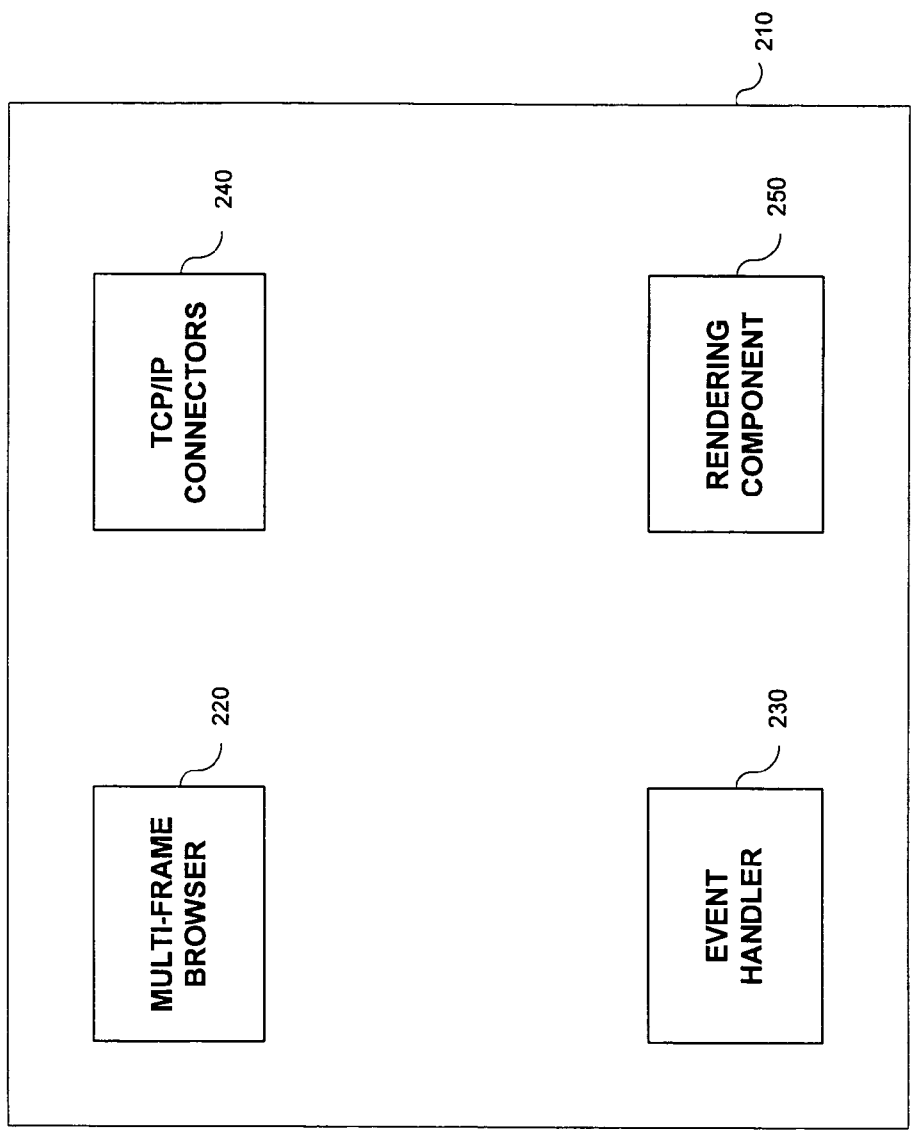
FIG. 2 is a block diagram of components of an interface system consistent with the present invention.

FIG. 2 is a block diagram of components of an interface system 210 consistent with the present invention. A primary purpose of interface system 210 is to present multiple frames of information on display 112 by, in part, using information displayed in one frame to retrieve and display information in another frame. Thus, interface system 210 separates a display screen into multiple (at least two) frames to display information from multiple sources, at least one of which is a legacy application while the others may be legacy applications and/or HTML-based applications.

Interface system 210 is a software application preferably written in the Java™ programming language, although other programming languages may be used. The Java programming language is an object-oriented programming language that is described, for example, in a text entitled "The Java Language Specification" by James Gosling, Bill Joy, and Guy Steele, Addison-Wesley, 1996. Programs written in the Java language are typically compiled to a universal executable format, using a "bytecode instruction set," which can be executed on any platform supporting the Java virtual machine (VM). The Java VM is described, for example, in a text entitled "The Java Virtual Machine Specification," by Tim Lindholm and Frank Yellin, Addison Wesley, 1996. Thus, interface system 210 can reside on any client workstation, such as computer system 100, that supports a Java VM.

Interface system 210 is comprised of a multi-frame browser 220, an event handler 230, TCP/IP connectors 240, and a rendering component 250. Multi-frame browser 220 is comprised of a customizable HTML browser for generating multiple frames for display, each frame designated to display information from at least one source. A suitable browser for this purpose is the "ICE Browser" from ICEsoft A/S of Bergen, Norway (http://www.icesoft.no/), because it is extensible, meaning that it can be configured to operate with the other components of system 210 such as handler 230 and rendering component 250.

Event handler 230 and rendering component 250 are extensions of multiframe browser 220. These extensions observe events in each frame and, when appropriate, retrieve and display information in another frame.

TCP/IP connectors 240 connect interface system 210 operating on computer system 100 to remote sources, such as a legacy application operating on host 124, and an HTML-based application operating on server 130.

A TCP/IP connector to the legacy application uses a set of low level communications functions referred to as an application programming interface (API). One such API was developed by The SABRE Group for general client workstation access to the SABRE host system, i.e., an exemplary legacy CRS application. The Java Common SABRE API (JSAPI) is in the form of Java classes. The JSAPI is based on a three layer architecture in which each layer handles a specific function: (1) a device layer, (2) a connection layer, and (3) a services layer.

The first two layers are common to all TCP/IP connections. The device layer handles all the session management functions, which are described in various texts on TCP/IP connections, including for example, W. Richard Stevens, TCP/IP Illustrated, Vol. 1, Addison-Wesley, 1994. The connection layer handles all of the connection specific details, which are also described in the aforementioned text by W. Richard Stevens. However, the services layer is comprised of host specific objects, called Service Providers, which are loaded when required to map SABRE LnIaTa terminal addresses to TCP/IP connections. LnIaTa, which stands for Line Interchange Address Terminal Address, is the unique 24-bit terminal address that identifies a user of system resources on the SABRE host, such as a terminal, workstation, or printer. The user typically connects through a Local Area Network (LAN) to an IP router that in turn connects the LAN to a secure dedicated network.

When a JSAPI connection is created on a client workstation, a session string or reference is used to query a registry or table, which contains system configuration information used to configure and control applications like system 210, to locate the desired Service Provider. Service Providers are program modules that allow applications to communicate with different end systems such as an Open Front End Processor (OFEP), or some other gateway, connected by an IP router to the dedicated network. Service Providers are typically dynamically loaded based on configuration information in the registry.

The OFEP is a TCP/IP interface to a Lineside MicroVax Front End (MFE) processor, which interfaces through another network with a Hostside MFE processor connected to the host processor of the SABRE host system. The MicroVax is a computer manufactured by Digital Equipment Corporation. The OFEP communicates with the Lineside MFE using the DECNet protocol while the Lineside MFE communicates with the Hostside MFE using the Ethernet protocol. The Hostside MFE in turn uses a channel protocol to communicate with the host computer. The OFEP is therefore responsible for actual data transfer with the SABRE host over the TCP/IP protocol, and manages incoming and outgoing I/O requests.

If the user does not specify a specific Service Provider by name, the first Service Provider enumerated in the registry is loaded. One of these Service Providers is the SABRE Front End Processor that provides connectivity to the SABRE host's various mainframe computers. The SABRE FEP also provides over value-added services, such as switchable printer support and connectivity to other external legacy CRS systems.

In contrast, the TCP/IP connector to the HTML-based application uses the standard internet HTTP (Hyper Text Transfer Protocol), which is explained in detail in the aforementioned text by W. Richard Stevens.

Figure 3:
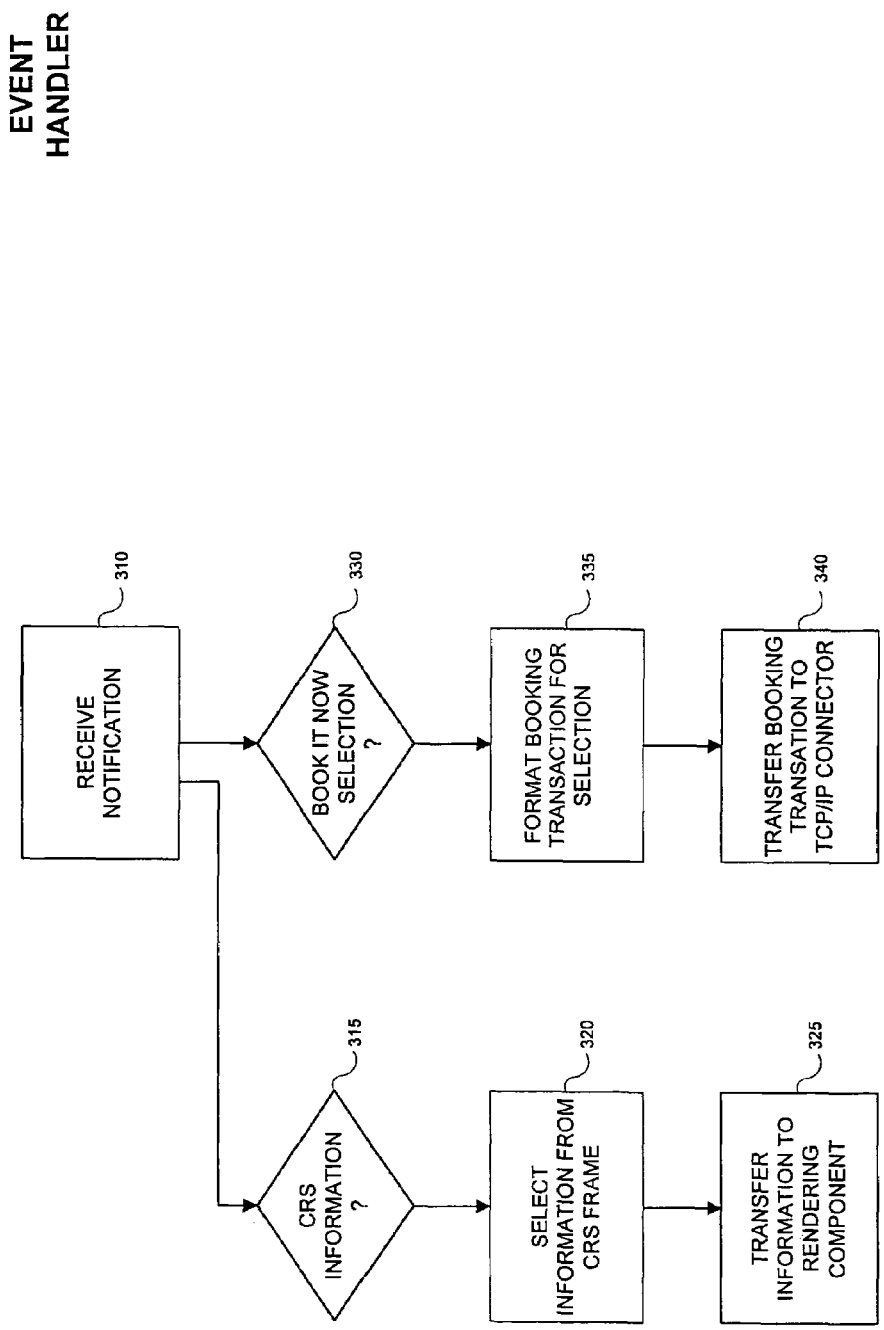
FIG. 3 is a flow diagram of the steps performed by the event handler of the interface system consistent with the present invention.

The process steps of event handler 230 will now be described with reference to FIG. 3. In general, event handler 230 reacts to changes in the state of each frame of browser 220. When the state of a frame changes, event handler 230 receives a notification of that change (step 310). For purposes of this description, there are two state changes that cause event handler 230 to receive a notification: (1) display of information in the frame corresponding to the legacy CRS application (step 315); (2) user selection of a "book it now" (BIN) button (step 330).

If event handler 230 determines that a received notification indicates that browser 220 has displayed information in the frame corresponding to the legacy CRS application (step 315), event handler 230 selects certain predetermined information from within that frame (step 320) and transfers the selected information to rendering component 250 (step 325). For example, when a legacy CRS application frame displays CRS schedule information, event handler 230 may select information identifying the passenger's destination to transfer to rendering component 250 so browser 220 can display in another frame information from a remote source, which is distinct from the legacy application, corresponding to the destination. This function of event handler 230 is explained further below in connection with FIGS. 5 and 6.

Under certain circumstances, browser 220 may display a BIN button in a frame. For example, the displayed information on a destination may include information on events scheduled to occur at the destination during a specific time period, e.g., after a date of arrival at the destination or prior to a date of departure from the destination as defined by the passenger's schedule. Browser 220 may display a BIN button for each event. When a user wishes to make a reservation to attend a selected event, or actually purchase a ticket to the event, the user merely selects the corresponding BIN button. When event handler 230 determines that a received notification indicates that a user has selected a BIN button displayed within a frame of browser 220 (step 330), event handler 230 formats a message to the legacy CRS application, which message is referred to as a booking transaction, indicating the users selection (step 335). Event handler 230 transfers the booking transaction to the TCP/IP connector for the legacy CRS application (step 340). This function of event handler 230 is explained further below in connection with FIGS. 7 and 8.

Figure 4:
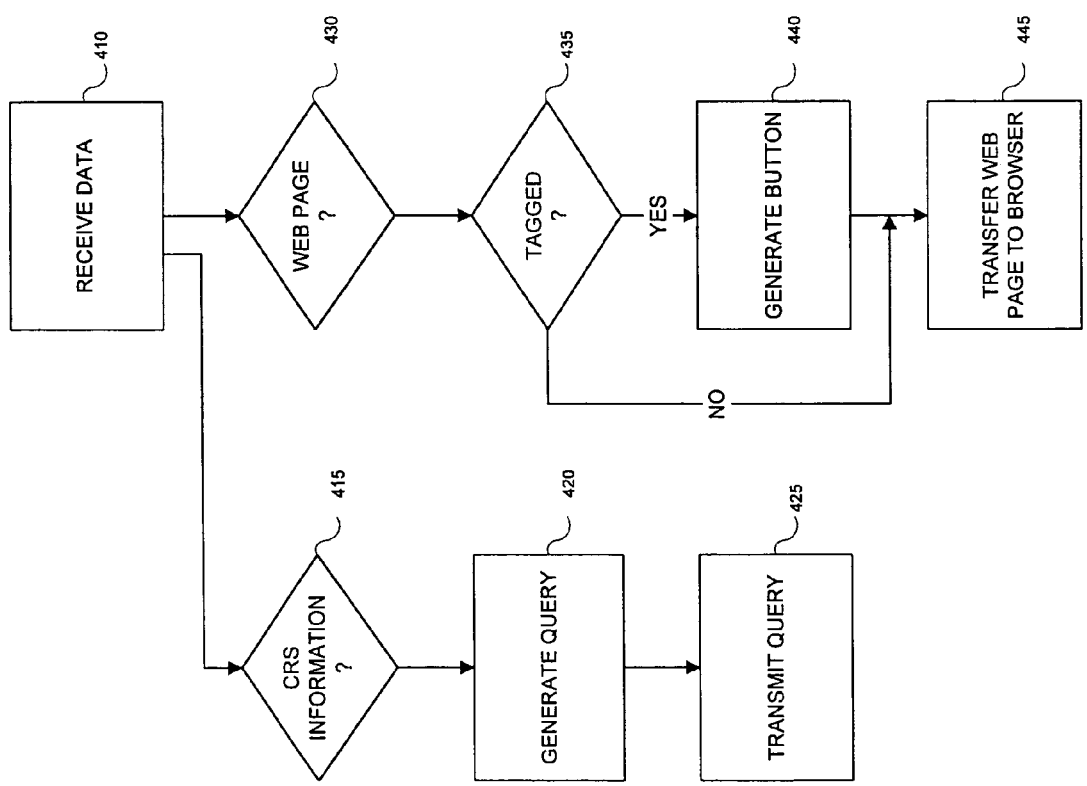
FIG. 4 is a flow diagram of the steps performed by the rendering component of the interface system consistent with the present invention.

FIG. 4 is a flow chart of the steps performed by the rendering component of interface system 210 consistent with the present invention. Rendering component 250 operates when it receives any one of two types of data (step 410): CRS information comprised of a passenger's schedule, and a web page.

When rendering component 250 receives CRS information on a passenger's schedule (step 415), it generates a query corresponding to selected information from the CRS information (step 420) and transmits the query to a TCP/IP connector (step 425). These two steps correspond to the event handler's selection of information from a display of CRS schedule information (see step 315, FIG. 3). This function of rendering component 250 is explained further below in connection with FIGS. 5 and 6.

When rendering component 250 receives a web page from an HTML-based application on a remote server on the Internet (step 430), rendering component 250 first determines whether the page contains any tags (step 435). A tag is a specific code in the web page indicating to the rendering component that a BIN button should be built for a corresponding piece of information in the web page. For example, when the legacy CRS application has the facility to reserve or purchase tickets to an event, a web page with information on that event may be tagged so rendering component 250 generates a BIN button for the event. Thus, when a tag exists in the web page, rendering component 250 builds the corresponding BIN button (step 440). Then, or when no tag exists (step 435), rendering component 250 transfers the web page to browser 220 for display in the corresponding frame. This function of rendering component 250 is explained further below in connection with FIGS. 7 and 8.

Figure 5:
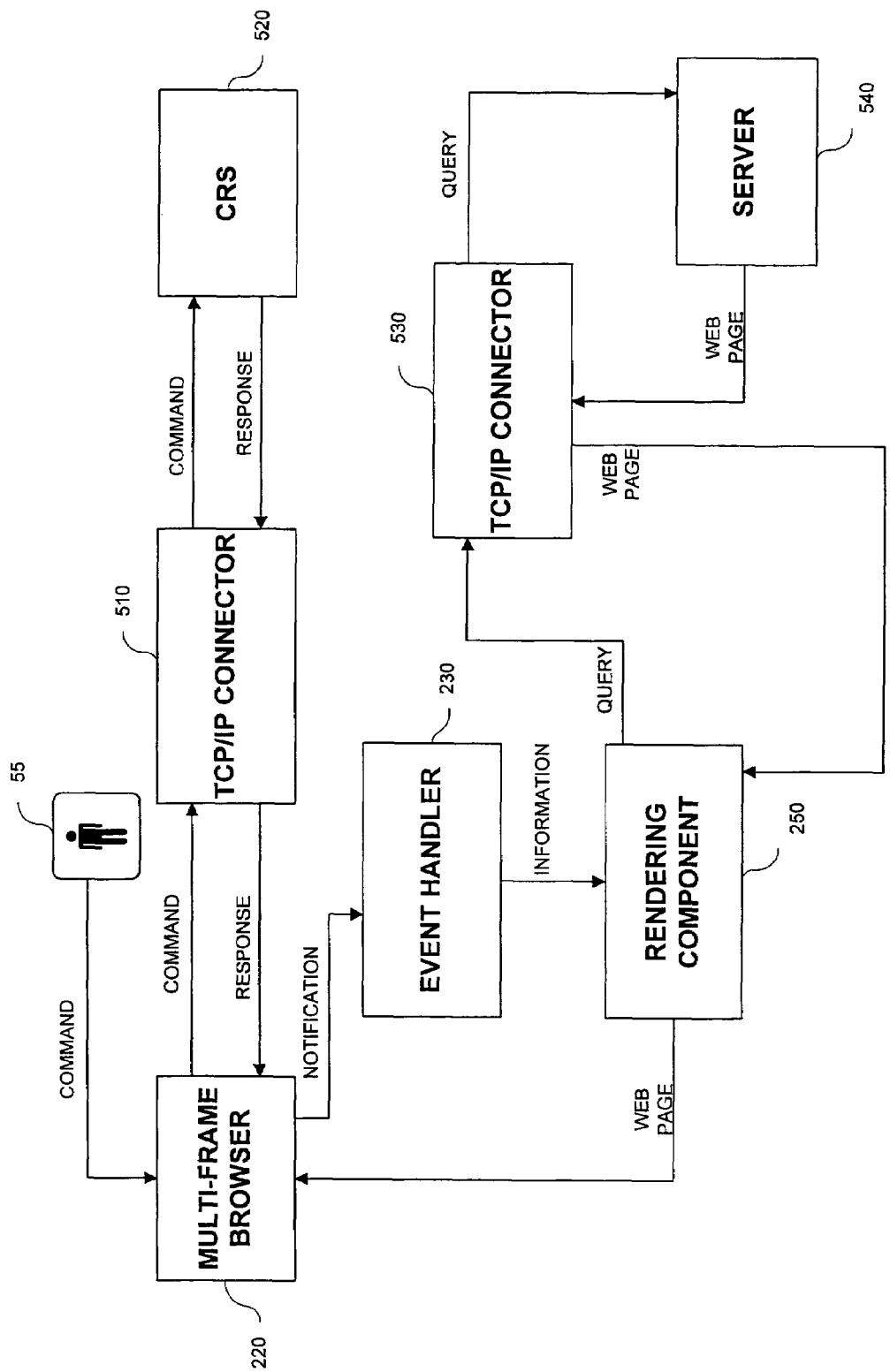
FIG. 5 is a block diagram used to explain a flow of information using the interface system consistent with the present invention.
Figure 6:
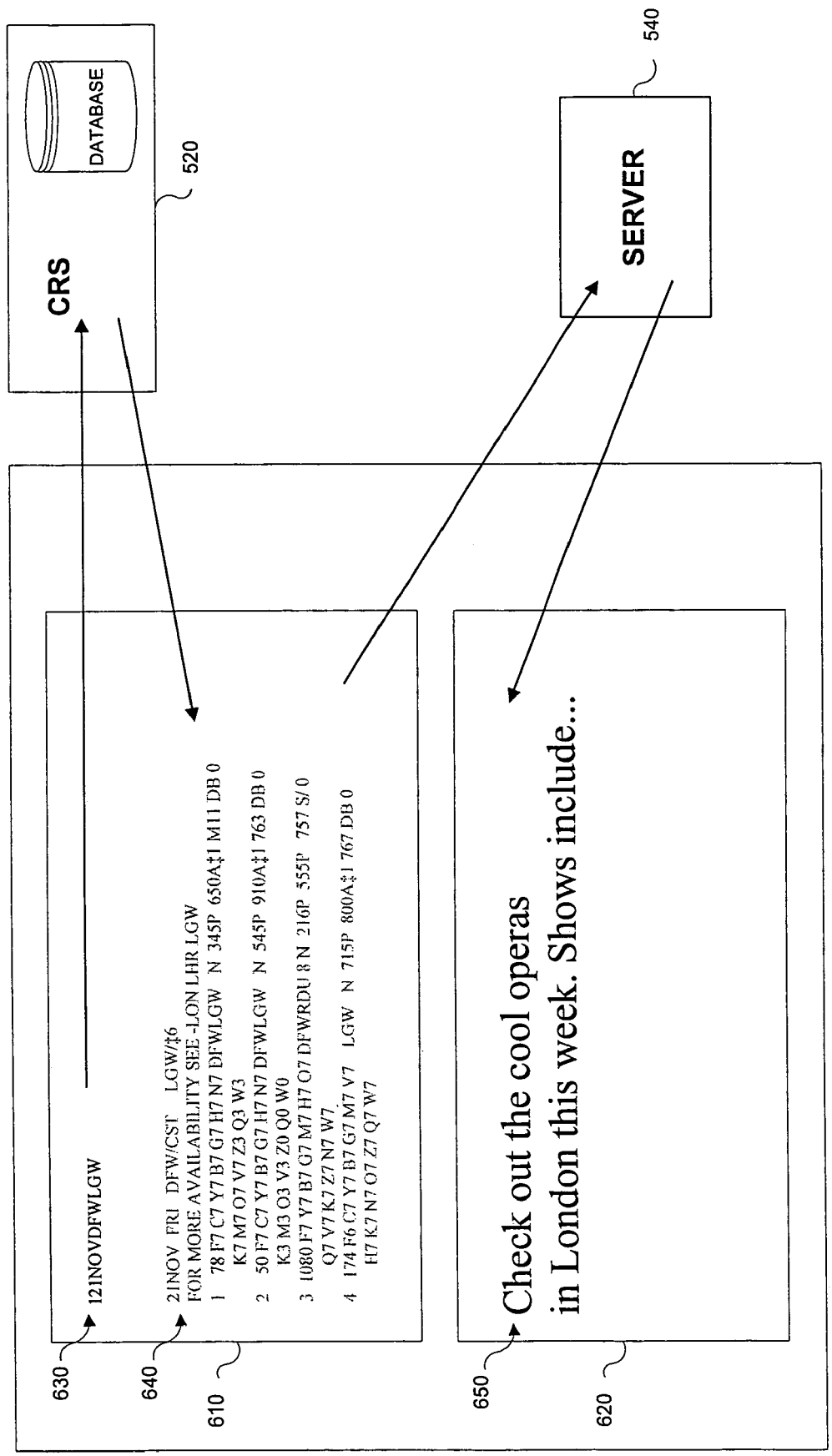
FIG. 6 is a view of the output displayed in connection with the information flow of FIG. 5.

Reference will now be made to FIGS. 5 and 6 to explain how interface system 210 offers a scheme for communicating between legacy applications and HTML-based applications. As shown in FIG. 5, a user 55 inputs a command into a first frame (610, FIG. 6) of multi-frame browser 220. For example, the user may wish to retrieve certain schedule information from a legacy CRS application 520. As shown in FIG. 6, the user input command 630 is "I21NOVDFWLGW". This command requests an itinerary (I) for flights on the 21st of November departing from Dallas-Fort Worth Airport (DFW) that are destined for London Gatwick Airport (LGW).

In this case, browser 220 uses a TCP/IP connector 510 for legacy CRS application 520 to send the user's command to the legacy CRS application 520. In turn, legacy CRS application 520 provides a response to browser 220, via the same TCP/IP connector 510, which response includes the requested itinerary information 640. As shown in FIG. 6, response 640 indicates that there are 6 possible flights or combinations of flights on the 21st of November (which is a Friday) from DFW to LGW. Additionally, response 640 also indicates that more itineraries may be found using London Heathrow Airport (LHR). The first itinerary shows a number of codes i.e., "78 F7 C7 Y7 B7 G7 H7 N7" corresponding to, for example, the airfare and seat availability on a flight departing from DFW at 3:45 PM and arriving at LGW at 6:50 AM.

Event handler 230 receives a notification that response 640 has been displayed, and selects certain information from the response, e.g., the destination city, to retrieve additional information on scheduled events related to the selected information. The selected information is in turn provided to rendering component 250 that generates a query and transmits the query via another TCP/IP connector 530 to a server 540 on the Internet. Assuming server 540 has information responsive to the query, server 540 responds with a web page that rendering component 250 receives via TCP/IP connector 530. The web page is provided to browser 220 for display in a frame different from the frame used to display the command and response. As shown in FIG. 6, a second frame 620 displays web page 650.

In this manner, interface system 210 effectively communicates information between a legacy application and an HTML-based application and displays information from both applications in a single multi-frame browser.

Figure 7:
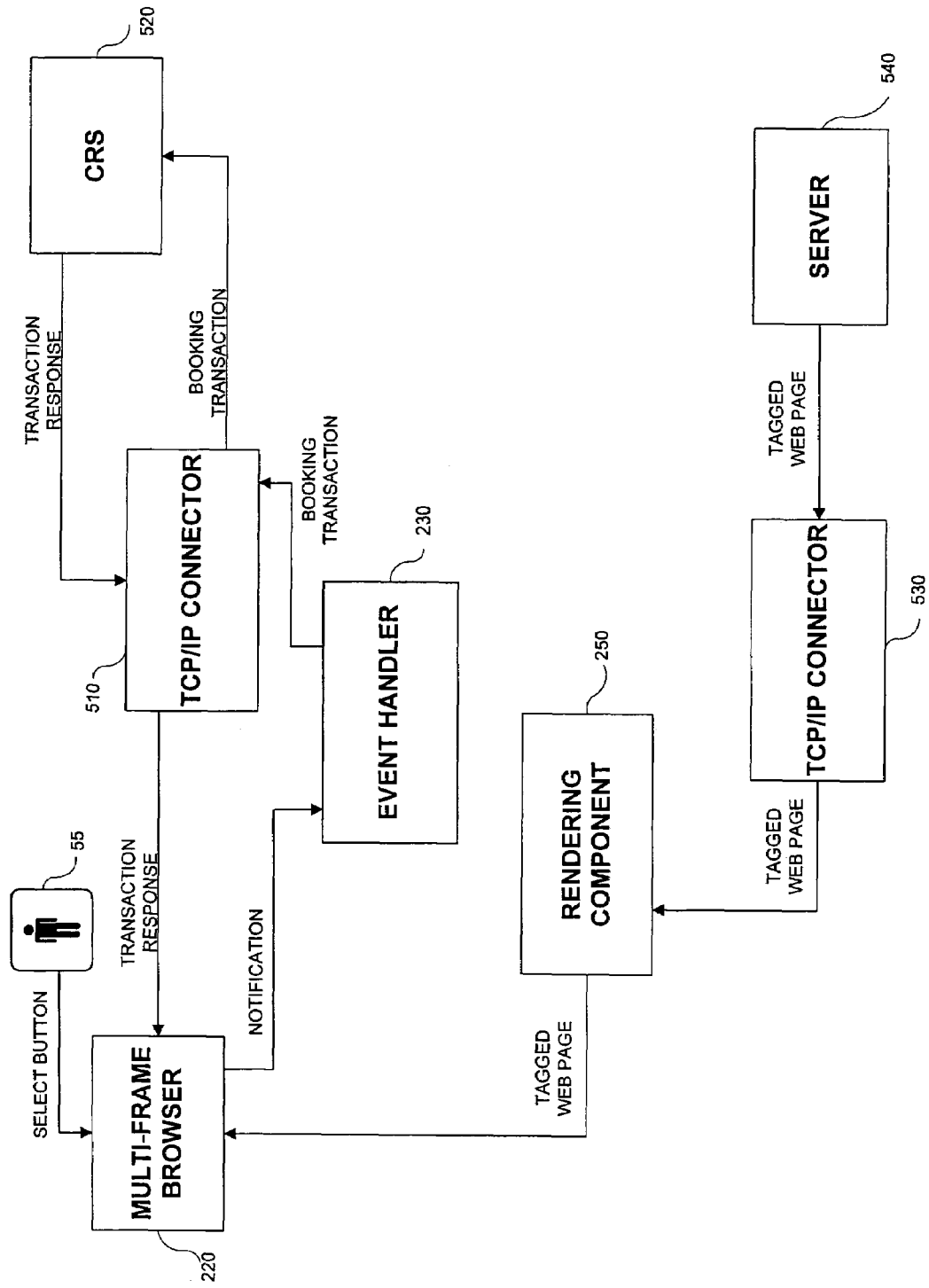
FIG. 7 is a block diagram used to explain another flow of information using the interface system consistent with the present invention.
Figure 8:
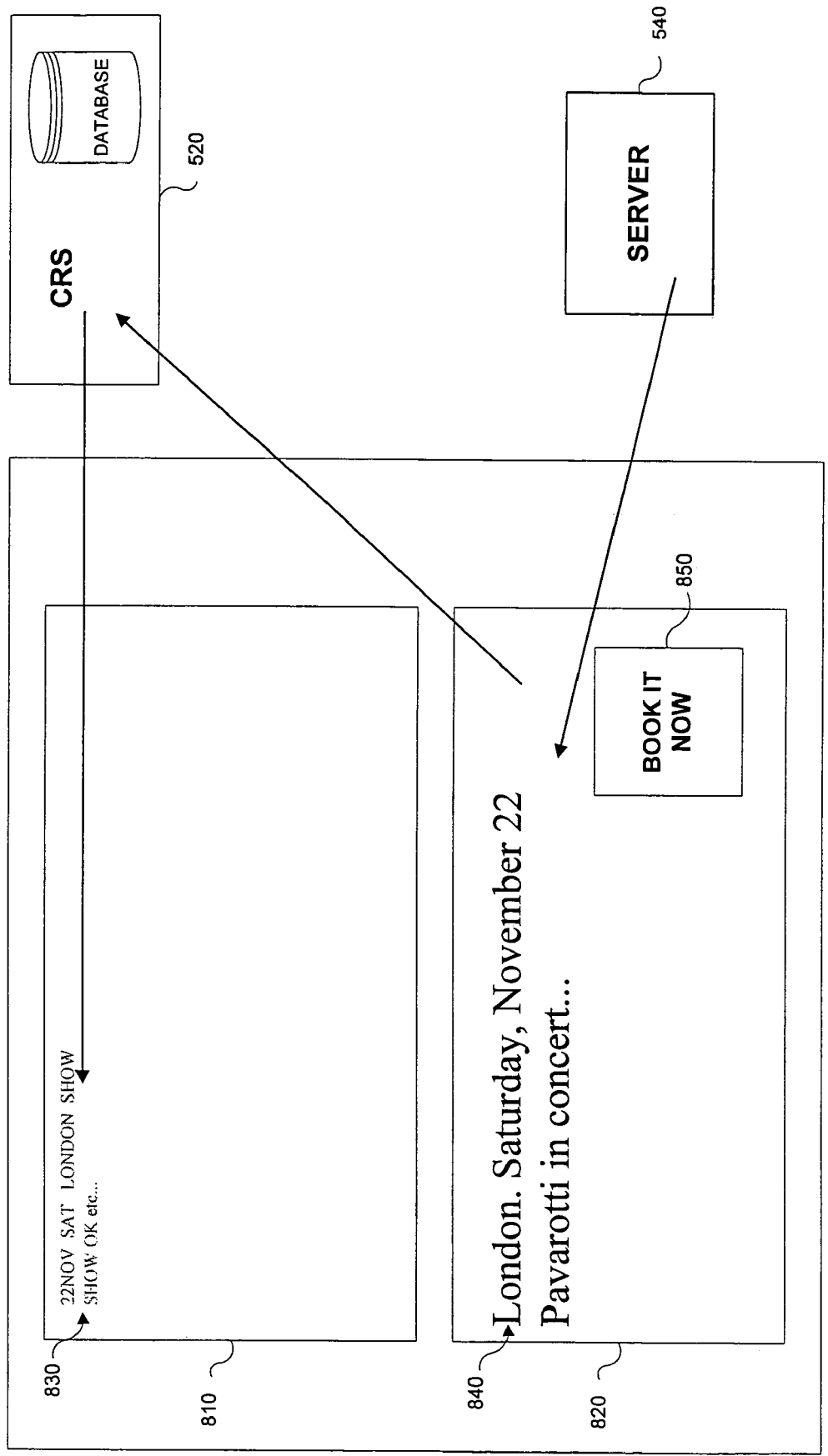
FIG. 8 is a view of the output displayed in connection with the information flow of FIG. 7.

Continuing with FIGS. 7 and 8, the operation of interface system 210 in connection with the BIN button will now be explained. In this implementation, the retrieved web page includes a tag indicating a BIN button. Server 540 provides the tagged web page to rendering component 250 via TCP/IP connector 530. Rendering component 250 in turn provides the tagged web page with the generated BIN button to browser 220. As shown in FIG. 8, the web page 840 and BIN button 850 are displayed in frame 820 corresponding to server 520. Those skilled in the art will recognize that browser 220 may generate additional frames to display web pages and corresponding BIN buttons, if any, for additional servers. Alternatively, an aggregated web page and corresponding BIN buttons, if any, for all servers may be displayed in a single frame. In other words, although the figures show two frames, one for the legacy CRS application and the second for an HTML-based application, the present invention contemplates multiple frames, one for each legacy CRS application and server. Alternatively, a single frame may be used to display aggregated information from multiple legacy CRS applications and a single frame may be used to display an aggregated web page from multiple servers on the Internet.

When user 55 selects a BIN button, event handler 230 receives an event notification, which causes handler 230 to generate a booking transaction to book a reservation for a ticket to the event corresponding to the BIN button. Handler 230 provides the transaction to TCP/IP connector 510 for legacy CRS application 520. After processing the transaction, legacy CRS application transmits a transaction response that is provided to browser 220 via connector 510. This response is displayed in the frame dedicated to legacy CRS application 520.

As shown in FIG. 8, the user's selection of the BIN button for the Pavarotti concert in London on November 22nd, causes interface system 220 to generate a booking transaction to book a reservation for the concert by communicating the transaction to legacy CRS application 520, which in turn displays a transaction response 830 in the browser frame 810 dedicated to the application.

In accordance with the present invention an interface (split screen) system provides a two-way interface between a legacy application and an HTML-based application running on the same client. A first frame of a browser supports a session with the legacy application, which may be a CRS, and a second frame supports an internet browser session. The interface system passes relevant data between these frames based on context. For example, when a user requests a flight to New York in the legacy CRS application frame the internet browser window responds by showing additional travel information specific to New York. Similarly, when a user displays a bookable travel item in the internet browser frame, it can be booked by executing a corresponding CRS transaction, which then responds in the legacy CRS application frame.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes a BIN button used to book transactions identified by an HTML-based application via the legacy CRS application. Additionally, the interface system may provide means such as a button displayed in the frame dedicated to the legacy CRS application to retrieve additional information for display in the other frame corresponding to selected information displayed from the legacy CRS application. The scope of the invention is defined by the claims and their equivalents.

That which is claimed:

1. A user interface for accessing information from multiple remote sources comprising:
    a first machine for receiving a request for data and for providing the requested data to be displayed in a first display area, wherein the first machine comprises a legacy computerized reservation system application;
    a second machine in communication with said first machine and having a display comprising at least the first display area and a second display area; and
    a third machine for receiving a query based at least in part upon the request for data automatically without a user initiating the query, wherein the third machine comprises a web-based application for providing results of the query in a web page, wherein the results of the query include at least one item for which booking is capable of being completed at the first machine, and wherein the results of the query are displayed in the second display area of the second machine, wherein the first machine further comprises a processor for:
    determining whether the web page of the results contains a tag; and
    displaying a button corresponding to the tag in the second display area, and wherein the processor further comprises machine-readable instructions for:

determining when the button is activated;

extracting the results of the query from the second display area when the button is activated;

composing a booking transaction from the results;

transmitting the booking transaction to the first machine; and displaying a confirmation message in the first display area.

2. The user interface of claim 1, wherein said third machine is also for storing data responsive to the query, and for providing the results of the query to the second machine.

3. A computer-implemented method for accessing information from multiple remote sources, comprising:

issuing a request for data to a first machine, wherein the first machine comprises a legacy computerized reservation system application;

displaying the requested data from the first machine in a first display area of a second machine;

transmitting a query based at least in part upon the request for data to at least a third machine automatically without a user initiating the query, wherein the third machine comprises a web-based application for providing results of the query in a web page;

receiving results of the query from the third machine, wherein the results of the query includes at least one item for which booking is capable of being completed at the first machine;

displaying results of the query in a second display area of the second machine;

determining whether the web page of the results contains a tag;

displaying a button corresponding to the tag in the second display area;

determining when the button is activated;

extracting the results of the query from the second display area when the button is activated;

composing a booking transaction from the results;

transmitting the booking transaction to the first machine; and displaying a confirmation message that the at least one item has been booked at the first machine in the first display area.

4. A non-volatile or volatile machine-readable storage medium having stored thereon machine executable instructions, the execution of said instructions adapted to implement a method for accessing information from multiple remote sources, said method comprising:

issuing a request for data to a first machine, wherein the first machine comprises a legacy computerized reservation system application;

displaying the requested data from the first machine in a first display area of a second machine;

transmitting a query based at least in part upon the request for data to at least a third machine automatically without a user initiating the query, wherein the third machine comprises a web-based application for providing results of the query in a web page;

receiving results of the query from the third machine, wherein the results of the query includes at least one item for which booking is capable of being completed at the first machine;

displaying results of the query in a second display area of the second machine;

determining whether the web page of the results contains a tag;

displaying a button corresponding to the tag in the second display area;

determining when the button is activated;

extracting the results of the query from the second display area when the button is activated;

composing a booking transaction from the results;

transmitting the booking transaction to the first machine; and displaying a confirmation message that the at least one item has been booked at the first machine in the first display area.

5. A user interface for accessing information from multiple remote sources comprising:

a first machine in communication with a display, wherein the first machine comprises a legacy computerized reservation system application, and wherein the first machine is for:

receiving a request for data; and displaying the requested data in a first display area in response to the request;

a second machine for:

providing the first display area and a second display area for displaying data therein; and a third machine for:

receiving a query based at least in part on the request for data automatically without a user initiating the query, wherein the third machine comprises a web-based application for providing results of the query in a web page, and wherein the results of the query are displayed in the second display area of said second machine and wherein said second machine is also for:

determining whether the web page of the results of the query contains a tag for booking at least one item within the results;

displaying a button corresponding to the tag in the second display area;

determining when the button is activated;

extracting the at least one item within the results of the query from the second display area when the button is activated;

composing a booking transaction for booking the at least one item;

transmitting the booking transaction to the first machine; and displaying a confirmation message that the at least one item has been booked at the first machine in the first display area.

6. A computer-implemented method for accessing information from multiple remote sources, comprising:

receiving, by a first machine, a request for data, wherein the first machine comprises a legacy computerized reservation system application;

displaying the requested data, from the first machine, in a first display area on a display;

transmitting a query based at least in part upon the request for data to at least a third machine automatically without a user initiating the query, wherein the third machine comprises a web-based application for providing results of the query in a web page; and displaying results of the query in a second display area on the display;

determining whether the web page of the results contains a tag for booking at least one item within the results;

displaying a button corresponding to the tag in the second display area;

determining when the button is activated;

extracting the at least one item within the results of the query from the second display area when the button is activated;

composing a booking transaction for booking the at least one item;

transmitting the booking transaction to the first machine; and displaying a confirmation message that the at least one item has been booked at the first machine in the first display area.

* * * * *